May 18, 1943. V. E. HOFMANN 2,319,683
APPARATUS FOR UNITING PARTS OF THERMOPLASTIC ARTICLES
Filed Aug. 21, 1941 3 Sheets-Sheet 1

INVENTOR
V. E. HOFMANN
BY
ATTORNEYS

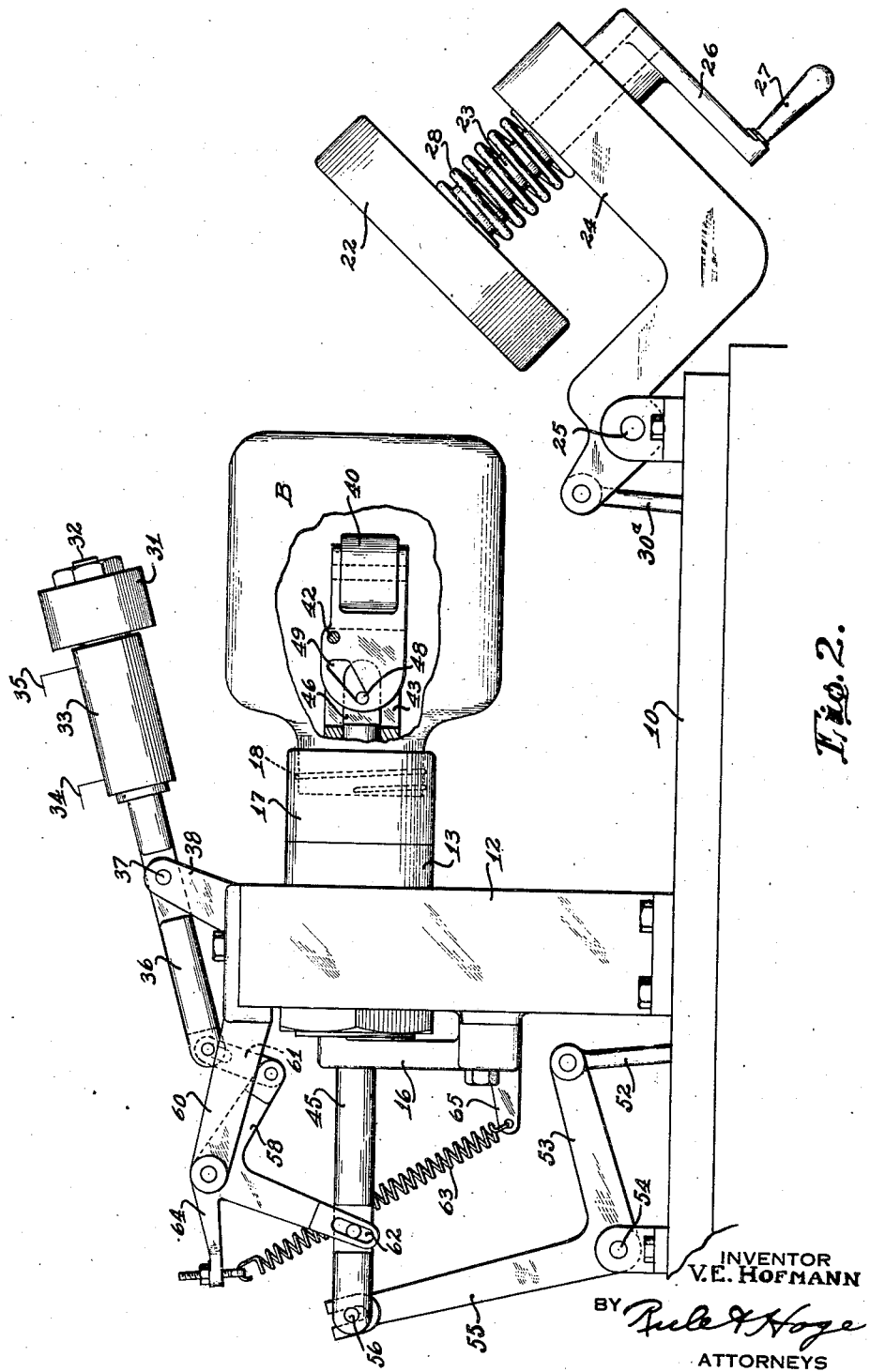

May 18, 1943.    V. E. HOFMANN    2,319,683
APPARATUS FOR UNITING PARTS OF THERMOPLASTIC ARTICLES
Filed Aug. 21, 1941    3 Sheets-Sheet 3
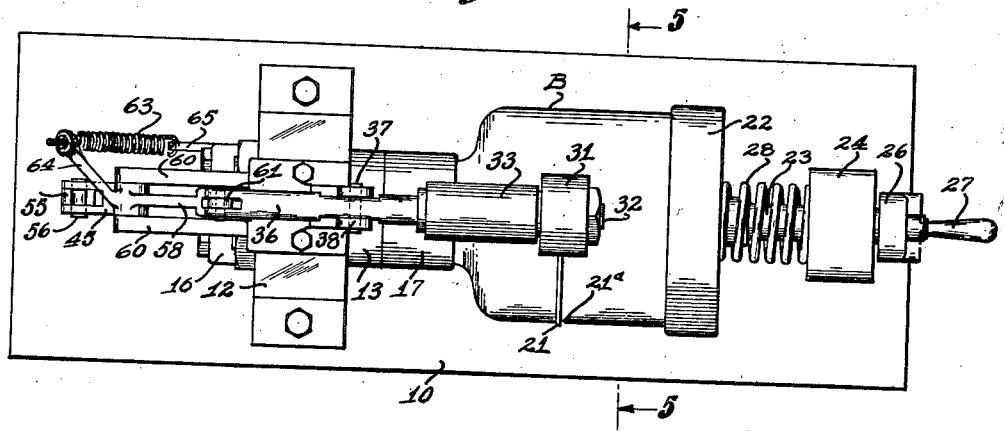
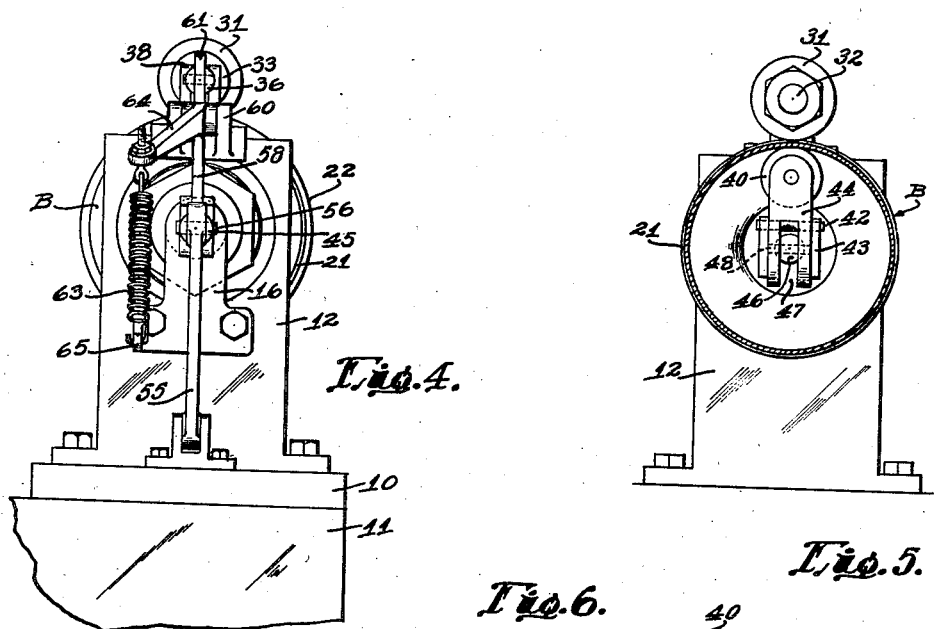
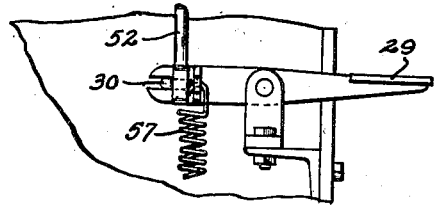
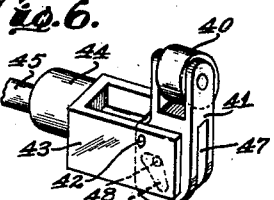
INVENTOR
V. E. HOFMANN.
BY
ATTORNEYS Patented May 18, 1943

2,319,683

UNITED STATES PATENT OFFICE 2,319,683

APPARATUS FOR UNITING PARTS OF THERMOPLASTIC ARTICLES

Victor E. Hofmann, Toledo, Ohio, assignor to Owens-Illinois Glass Company, a corporation of Ohio Application August 21, 1941, Serial No. 407,770

11 Claims. (Cl. 18—11)

My invention relates to apparatus for use in uniting parts of articles made of thermoplastic materials, and particularly to means adapted for integrally uniting or welding together complementary parts of bottles, jars or other hollow containers made of such materials.

An object of my invention is to provide an apparatus which is specially adapted for use in uniting the sections of articles such as bottles and jars in which the interior surfaces of the parts to be united, are comparatively inaccessible and do not lend themselves readily to the use of conventional apparatus and methods.

Other objects of the invention will appear hereinafter.

Referring to the accompanying drawings:

Fig. 2 is a side elevation of the apparatus, parts being broken away, showing the operating parts of the mechanism in a different position from that of Fig. 1.

Fig. 3 is a plan view of the apparatus.

Fig. 4 is an end elevation.

Fig. 5 is a sectional elevation at the line 5—5 on Fig. 3.

Fig 6 is a detail view showing a backing roll and associated parts.

Figure 1:
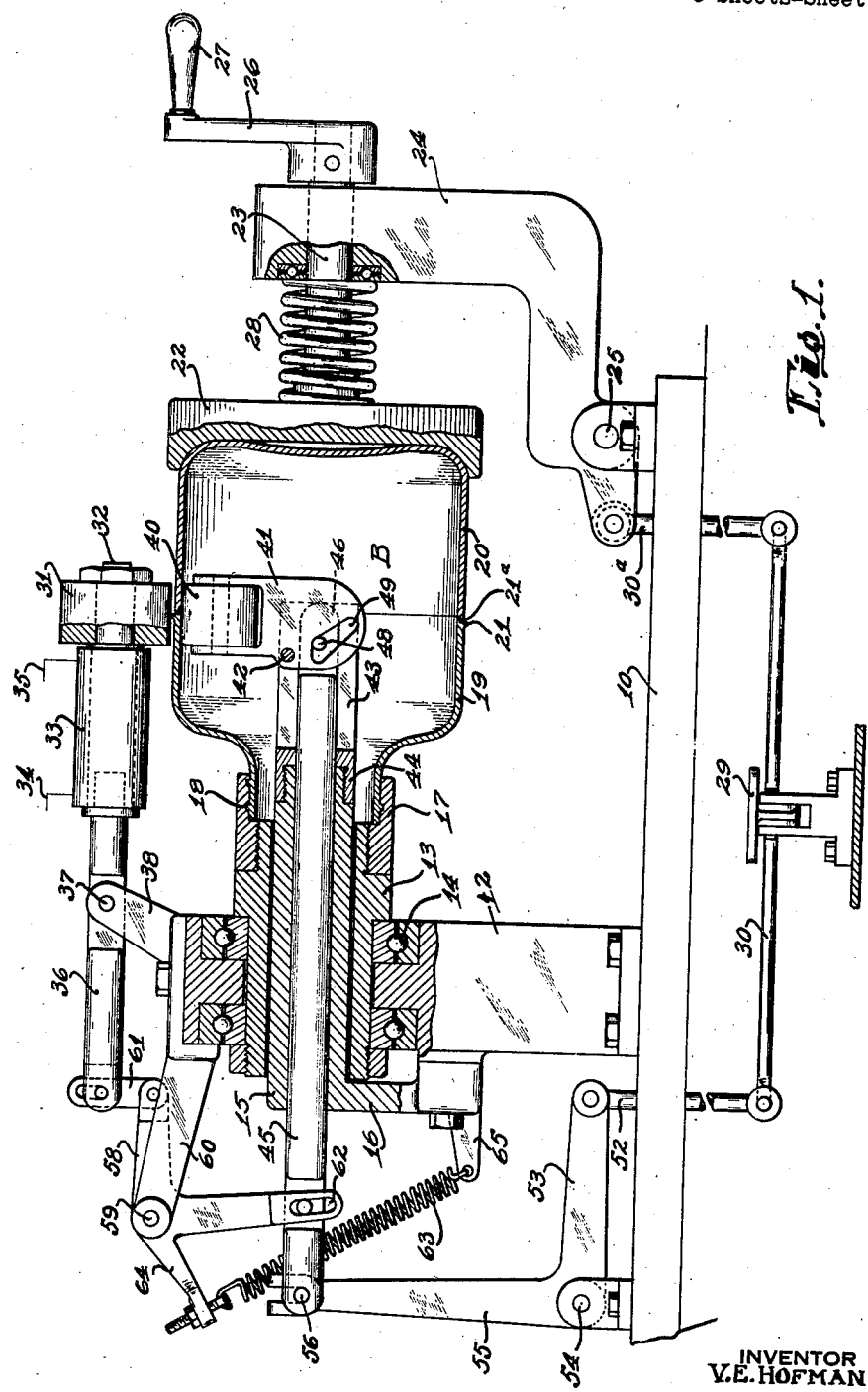
Fig. 1 is a sectional elevation of an apparatus adapted for practicing my invention, the framework beneath the table being broken away.

The apparatus is mounted on a platform 10 supported on a framework 11 (Fig. 4). A standard 12, bolted to the platform, provides a support for a cylindrical shaft 13 mounted for rotation in ball bearings 14 in the standard 12. The shaft 13 forms a carrier for a workpiece as hereinafter described. A stationary tubular shaft 15 is mounted within the carrier 13 and is formed at one end with an arm 16 bolted to the standard 12. A ring 17 threaded on the carrier 13 provides a holder for the workpiece and as shown is formed with an interior screw threaded or spiral recess 18, corresponding to the screw thread formed on the neck of the workpiece, here shown as a round bottle B.

This article B is made in two complementary sections 19 and 20 of a thermoplastic material. The section 19 as shown, is formed with an annular bead 21 extending along its edge, and which under heat and pressure is adapted to be softened and welded to the abutting edge of the section 20, and at the same time ironed out in a manner to obliterate the seam while welding the two parts into a unitary structure. These parts may consist of any thermoplastic material which becomes soft and plastic when heated. The abutting edges of the sections 19 and 20 may be given any suitable shape or configuration adapted to facilitate the welding together of the parts in accordance with my invention. As shown, the section 20 is formed with a beveled edge or recess 21ª (Fig. 3) to receive the softened material supplied by the bead 21.

During the welding operation, the section 20 of the workpiece is held by a holder in the form of a disk 22, the front face of which may be recessed or shaped to conform to the end surface of the workpiece. The holder 22 is formed with a stem or shank 23 which is rotatively mounted in an arm 24. The latter is mounted by means of a pivot pin 25 in bearings on the platform 10, permitting said arm to swing downward to the Fig. 2 position for releasing the article B and for receiving the sections 20. A hand crank 26 keyed to the shank 23 and provided with a handle 27, provides a means for rotating the holder 22 and with it, the workpiece B. A coil spring 28 mounted on the shank 23 between the arm 24 and the holder 22, provides a yielding means for transmitting pressure to the holder 22. The means for applying pressure for holding the sections of the workpiece together during the welding operation, may comprise a treadle 29 (Figs. 1 and 4) connected through a horizontal rod 30 and vertically disposed rod 30ª to the arm 24. A coil tension spring 57 (Fig. 4) is connected to the treadle and transmits a holding pressure to the work holder as hereinafter set forth.

A sealing means for integrally uniting the two sections 19 and 20 comprises a heating roll 31 mounted for rotation on a shaft 32 and kept at the required high temperature by means of an electrical heating element 33 connected by means of conductors 34 and 35 in an electrical heating circuit. The roll 31 and heating element 33 are carried on a horizontally disposed arm 36 mounted for rocking movement by means of a pivot pin 37 on a bearing bracket 38 on the standard 12.

A backing roll 40 adapted to bear against the inner surface of the workpiece, directly opposite the heating roll 31, is carried on a short arm 41 pivotally connected by a pivot pin 42 to a stationary carrier 43. The latter comprises a tubular extension or shank 44 which is internally screw threaded for connection with a threaded extension of the tubular shaft 15. The arm 41, carrying the backing roll, is adapted to swing from its upright position (Fig. 1) downward about the pivot 42 to the Fig. 2 position in which it is in line with the shaft 15. This permits the removal of the finished workpiece and the placing of a subsequent section 19 in the work holder.

Extending lengthwise through the tubular shaft 15 is a rod 45 movable longitudinally and having operating connections with the rolls 31 and 40. The forward end of the rod 45 includes a flattened section 46 which extends into the recess 47 (Fig. 6) formed by the bifurcated end of the arm 41. A pin 48 attached to the section 46, extends into or through cam slots 49 formed in the bifurcated end of the arm 41. When the rod 45 is in its forward position (Fig. 1) the pin 46 holds the arm 41 in its upright position and holds the backing roll in contact with the workpiece. When the rod 45 is withdrawn lengthwise, the pin 46 engages the opposite wall of the slot 49 and swings the arm 41 downward to the Fig. 2 position. The rod 45 is retracted by means of the foot pedal 29 which is connected through the horizontal rod 30 and a vertically disposed rod 52, to the horizontal arm of a bell crank 53 pivoted at 54 over the platform 10. The bell crank comprises an upwardly extending arm 55, the upper end of which is connected at 56, to the rod 45. Pressure on the foot pedal operates through the bell crank to move the rod 45 to the left (Fig. 1). A coil spring 57 (Fig. 4) operates when the foot pedal is released, to move the rod 45 forward.

Operating connections between the rod 45 and the heating roll 31 include the arm 36, a bell crank 58 pivoted at 59 to a bracket 60, a link 61 providing the connection between one arm of the bell crank and the rod 36, and a slot and pin connection 62 between the other arm of the bell crank and the rod 45. When the rod 45 is retracted or moved to the left, as above described, it operates through the bell crank 58 to swing the rod 36 about its pivot and lift the heating roll away from the workpiece. The heating roll is held in operative position with a yielding pressure by means of a coil spring 63 which is connected to an arm 64 on the bell crank 58, the other end of said spring being anchored to a stationary arm 65. The heat for welding the sections of the workpiece together may be supplied to either or both of the rolls 31 and 40.

The operation is as follows:

To permit a workpiece to be placed on the machine, the operator depresses the pedal 29. This operates to draw the rod 45 outwardly, thereby swinging the arm 41 with the backing roll 40, into line with said rod so that the section 19 of the workpiece may be slipped over said roll and attached to the holding sleeve 17. Said outward movement of the rod 45 also operates to swing the heating roll 31 upward to the Fig. 2 position. At the same time the holding disk 22, through its connection with the foot pedal, is swung downward (Fig. 2) permitting the section 20 of the workpiece to be positioned therein. The pedal is now released, permitting the spring 57 (Fig. 4) to return the parts to operating position (Fig. 1), the spring 57 operating to hold the sections of the workpiece firmly together and the rolls 40 and 31 in operative position. The operator now rotates the workpiece by means of the hand cranks 26, causing the bead 21 to advance beneath the heating roll 31. The heat is sufficient to soften the bead so that the material is welded to the abutting end of the section 20. The pressure of the heating roll causes the material which forms said bead to be flattened down and flow into the annular groove 21ª provided at the abutting surfaces of the two sections 19 and 20. These abutting end portions may be given any desired shape to facilitate the uniting and welding together of the two sections.

As indicated in Fig. 3, the bead 21 is substantially or completely eliminated as the welding operation proceeds so that the two sections are integrally united with no visible line of connection. A certain amount of heat is transmitted from the roll 31 to that portion of both sections of 19 and 20 gripped between the rolls, raising their temperature to a point which facilitates the formation of a perfect weld.

Modifications may be resorted to within the spirit and scope of my invention.

I claim:

1. Apparatus for uniting separate, complementary sections of a hollow article of thermoplastic material, comprising holding devices individual to said sections and mounted for rotation about the same axis, said holding devices arranged to hold said sections together with their edges abutting, means for holding a backing roll in contact with the interior surfaces of said sections, a heating roll opposite the backing roll, means for heating said heating roll, and means for causing a relative movement of said sections and said rolls whereby the said abutting edges are advanced between said rolls.

2. Apparatus for uniting the parts of a hollow article made in separate sections, comprising a tubular holder for one said section, means for attaching the said section to the holder, a rod extending through said holder, a stationary carrier, an arm pivotally mounted on said carrier and extending at an angle to said rod, a backing roll carried by said arm, said rod being movable lengthwise, means providing an operating connection between said arm and rod for swinging said arm and roll into line with the rod when the latter is moved lengthwise in one direction to permit the said article to pass over said arm for engagement with said holder, said roll being movable into contact with the interior surface of the article when the rod is moved in the opposite direction.

3. Apparatus for uniting the parts of a hollow article made in separate sections, comprising a holder for one said section, a rod extending through said holder, a stationary carrier, an arm pivotally mounted on said carrier and extending at an angle to said rod, a backing roll carried by said arm, said rod being movable lengthwise, means providing an operating connection between said arm and rod for swinging said arm and roll into line with the rod when the latter is moved lengthwise in one direction to permit the said article to pass over said arm for engagement with said holder, said roll being movable into contact with the interior surface of the article when the rod is moved in the opposite direction, a heating roll mounted to swing into and out of contact with the article supported on said holder, and operating connections between said rod and heating roll for swinging the heating roll into engagement with the exterior surface of the article when the rod is moved in a direction to bring said backing roll into contact with the interior surface of the article.

4. The combination of a tubular holder for holding the open end of a hollow article, a backing roll, an arm carrying said roll, a stationary carrier on which said arm is pivotally mounted for swinging movement in one direction into a position to permit said end of the article to pass thereover for bringing the article into position to be held by said holder, and for swinging movement in the opposite direction into a position in which the roll is in contact with the interior surface of the article while the latter is held by said holder, a rod extending lengthwise through said holder, means for moving the rod in the direction of its length, and means providing an operating connection between the rod and said arm for swinging the arm.

5. The combination of a tubular holder for holding the open end of a hollow article, a backing roll, an arm carrying said roll, a stationary carrier on which said arm is pivotally mounted for swinging movement in one direction into a position to permit said end of the article to pass thereover for bringing the article into position to be held by said holder, and for swinging movement in the opposite direction into a position in which the roll is in contact with the interior surface of the article while the latter is held by said holder, and a cooperating roll mounted to swing toward and from the article while the latter is held by said holder for engaging the exterior surface of the article at a point opposite the backing roll when the latter is in said position of contact with the interior surface of the article.

6. The combination of a tubular holder for holding the open end of a hollow article, a backing roll, an arm carrying said roll, a stationary carrier on which said arm is pivotally mounted on said holder for swinging movement in one direction into a position to permit said end of the article to pass thereover for bringing the article into position to be held by said holder, and for swinging movement in the opposite direction into a position in which the roll is in contact with the interior surface of the article while the latter is held by said holder, a cooperating roll mounted to swing toward and from the article while the latter is held by said holder for engaging the exterior surface of the article at a point opposite the backing roll when the latter is in said position of contact with the interior surface of the article, means for heating one of said rolls, and means for rotating said holder and causing the article to advance while said rolls are in rolling contact therewith.

7. The combination of a holder for a hollow article having a cylindrical body portion, means for rotating said holder about a stationary axis, means for securing the article to said holder for rotation therewith and with the axis of said body portion coinciding with the said stationary axis, a pressure roll, means for holding it against the exterior cylindrical surface of said article, a backing roll, and means for holding it against the interior surface of the article opposite said pressure roll, said rolls being arranged with their axes parallel with said stationary axis, whereby the surfaces of the article in contact with the rolls are caused to advance in a path extending circumferentially of the article.

8. The combination of a tubular holder, a stationary bearing sleeve on which the holder is mounted for rotation, an arm connected by a pivot with said bearing sleeve, a roll carried by said arm, a shaft extending lengthwise through said sleeve and movable lengthwise therein, means providing a connection between said shaft and arm by which the arm and roll are swung into line with the shaft when the latter is moved in one direction to permit an open ended workpiece to pass over said arm and roll for engagement with the holder, means for attaching the workpiece to said holder, said arm and roll being movable about said pivot to bring the roll into operative relation to the workpiece when said rod is moved in the reverse direction, and means for gripping and rotating the workpiece and thereby rotating said holder.

9. The combination of a tubular holder, a stationary bearing sleeve on which the holder is mounted for rotation, an arm connected by a pivot with said bearing sleeve, a roll carried by said arm, a shaft extending lengthwise through said sleeve and movable lengthwise therein, means providing a connection between said shaft and arm by which the arm and roll are swung into line with the shaft when the latter is moved in one direction to permit an open ended workpiece to pass over said arm and roll for engagement with the holder, said arm and roll being movable about said pivot to bring the roll into operative relation to the workpiece when said rod is moved in the reverse direction, a second roll, and operating connections between said rod and said second roll for swinging the latter to and from the exterior surface of the workpiece when said first mentioned roll is moved to and from the interior surface of the workpiece.

10. Apparatus for welding together complementary sections of a hollow article made of thermoplastic material, said apparatus comprising a holder for an open ended section of the article, said holder mounted for rotation, a backing roll, an arm carrying said roll and adapted to enter said open ended section, said arm mounted to swing from an operative position in which the roll is held in contact with the inner surface of the section attached to said holder, to a position to permit the said section to pass thereover, a heating roll mounted to swing into and out of engagement with the outer surface of the article at a point opposite the backing roll, a second holder adapted to engage the other section of the article and hold said sections together, means for moving said second holder to and from a holding position, and interconnected mechanism between said second holder and said rolls by which the latter are moved to and from engagement with the article concomitantly with the movement of said second holder to and from its holding position.

11. Apparatus for welding together complementary sections of a hollow article made of thermoplastic material, said apparatus comprising a holder for an open ended section of the article, said holder mounted for rotation, a backing roll, an arm carrying said roll and adapted to enter said open ended section, said arm mounted to swing from an operative position in which the roll is held in contact with the inner surface of the section attached to said holder, to a position to permit the said section to pass thereover, a heating roll mounted to swing into and out of engagement with the outer surface of the article at a point opposite the backing roll, a second holder adapted to engage the other section of the article and hold said sections together, means for moving said second holder to and from a holding position, and interconnected mechanism between said second holder and said rolls by which the latter are moved to and from engagement with the article concomitantly with the movement of said second holder to and from its holding position, said interconnecting mechanism including a rod extending lengthwise through said first mentioned holder and operatively connected to said backing roll, a pivotally mounted support for said heating roll, connections between said rod and said support for swinging the latter about its pivot, a foot pedal, and means operatively connecting the pedal to said rod and to said second holder.

VICTOR E. HOFMANN.